United States Patent [19]
Sigrist

[11] 3,758,787
[45] Sept. 11, 1973

[54] APPARATUS FOR DETERMINING THE AMOUNT OF THE DISPERSED PHASE IN A SUSPENSION

[76] Inventor: Willy Sigrist, 6373 Ennetburgen, Switzerland

[22] Filed: Mar. 24, 1972

[21] Appl. No.: 237,733

[30] Foreign Application Priority Data
Mar. 29, 1971 Switzerland.................... 4551/71

[52] U.S. Cl.................. 250/574, 356/104, 356/208
[51] Int. Cl.. G01n 21/00, G01n 21/06, G01n 21/26
[58] Field of Search.................... 356/208, 103, 104; 250/218

[56] References Cited
UNITED STATES PATENTS

| 3,376,425 | 4/1968 | Kraus et al.............. | 356/103 X |
| 3,462,609 | 8/1969 | Beattie.................... | 250/218 |
| 3,248,551 | 4/1966 | Frommer.................. | 250/218 |
| 3,361,030 | 1/1968 | Goldberg................. | 250/218 X |

Primary Examiner—James W. Lawrence
Assistant Examiner—T. N. Grigsby
Attorney—Kurt Kelman et al.

[57] ABSTRACT

The amount of the dispersed phase in a suspension is determined by causing the suspension to flow in a free falling jet, directing a beam of light transversely on the jet, and measuring the light scattered at an angle of about 15° to 40° relative to a plane which includes the optical axis of the incident beam and a straight line perpendicular to that optical axis and to the longitudinal axis of the jet at the point of intersection. The resistance or output of a photoelectric cell receiving the scattered light is indicative of the amount of the suspended phase.

5 Claims, 4 Drawing Figures

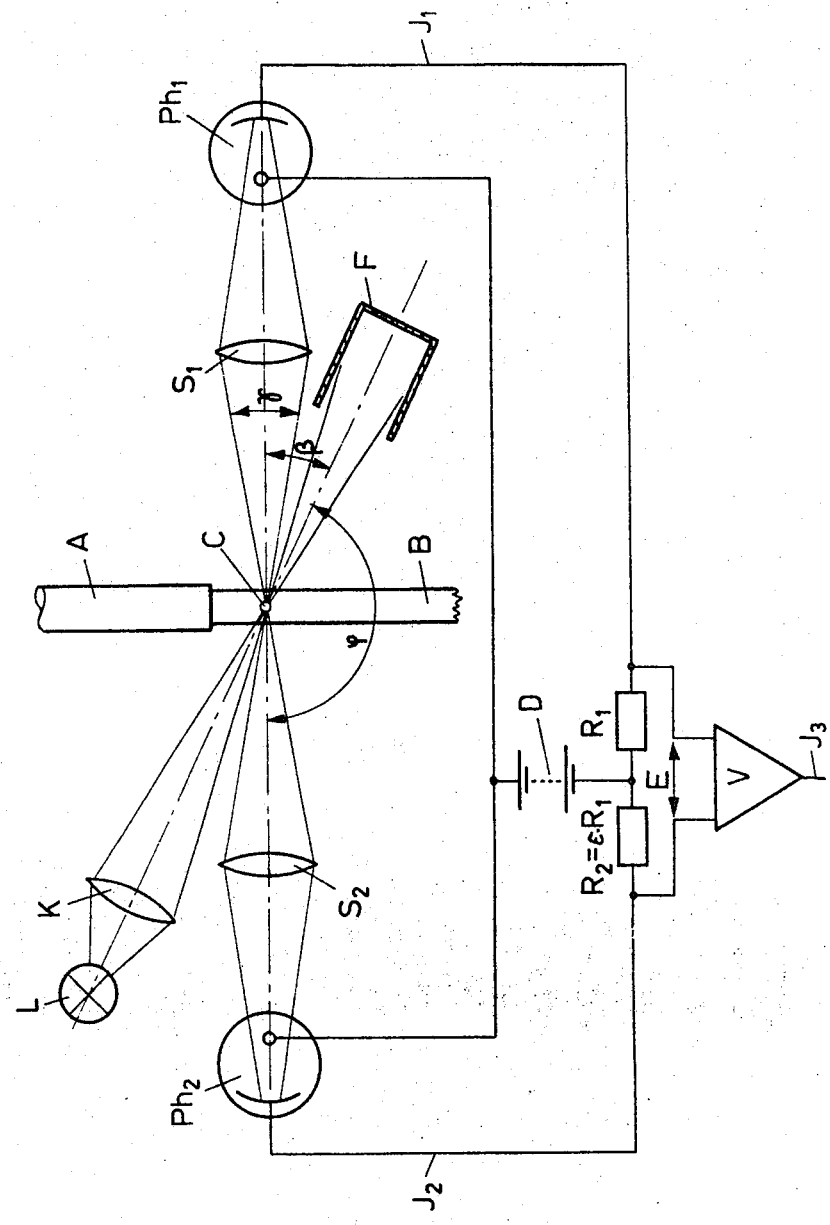

APPARATUS FOR DETERMINING THE AMOUNT OF THE DISPERSED PHASE IN A SUSPENSION

This invention relates to the determination of the amount of the dispersed phase in a suspension, and particularly to a method and apparatus for optically determining the amount of the dispersed phase.

It is known to determine the turbidity of a liquid caused by finely dispersed material by optical devices as a measure of the amount of the dispersed phase. Absorption measurements and measurements of the light scattered by the suspended material have been resorted to heretofore. It is common practice, for example, to monitor the growth of microorganisms in fermentation processes by measuring the light absorption of the diluted broth. It has been found that microorganisms, such as bacteria and yeasts, differ in their light scattering properties from suspended mineral matter in that the light scattered by the microorganism has a distinct maximum of intensity in an angular range of 0° to 30° from the axis of the incident light beam. Similar scattering properties are also found in other transparent or translucent suspended particles bigger than the wavelength of the light beam and having an index of refraction which differs little from that of the continuous liquid phase in which they are suspended. An arrangement in which the scattered light emitted by the suspension at an angle of 0° to 30° to the axis of the incident beam is measured, is thus particularly sensitive to the amount of microorganisms and similar organic matter.

When fermentation broths and similar suspensions of organic material are examined by optical means while enclosed in transparent vessels, the measurements are sometimes rendered difficult by deposits of the suspended material on the transparent walls of the vessel. It is therefore preferred to make optical measurements on suspensions while the same flow in an unconfined jet or stream. It is difficult, however, to determine light scattered by the suspended phase in a flowing jet. Even pure water causes some scattering of light due to refraction and multiple internal reflexion on the interfaces of the liquid and the ambient air, thereby yielding spurious readings seemingly indicative of turbidity.

It is a primary object of this invention to avoid such faulty readings. It has been found that the effects due to the interfaces of liquid and air can be minimized or avoided if the scattered light is measured in a measuring point remote from a plane defined by the optical axis of the incident beam of the light source employed, and by a straight line perpendicular to that optical axis and the longitudinal axis of the jet at their point of intersection.

The apparatus employed for performing the method includes necessary means for discharging the investigated suspension in a jet, a light source, a first optical system directing the light of the source toward the jet as an incident bean which has an optical axis intersecting the longitudinal jet axis, a photoelectric element, and a second optical system whose axis substantially intersects the two first-mentioned axes and directs light of the incident beam scattered by the jet to the photoelectric element and thereby causes the element to generate an electrical signal indicative of the amount of dispersed phase in the suspension. The axis of the second optical system is obliquely inclined relative to the plane defined in the preceding paragraph, and the second optical system is spaced from the plane. A light trap spaced from the afore-mentioned point of intersection away from the light source in the direction of the axis of the first optical system is directed toward the light source and receives the light thereof which is linearly transmitted by the jet.

Other features, additional objects, and many of the attended advantages of the invention will readily be appreciated, as the invention becomes better understood by reference to the following detailed description of preferred embodiments when considered in connection with the appended drawing in which:

FIG. 4 shows a further modification of the device of FIG. 3 in corresponding view.

Figure 1:
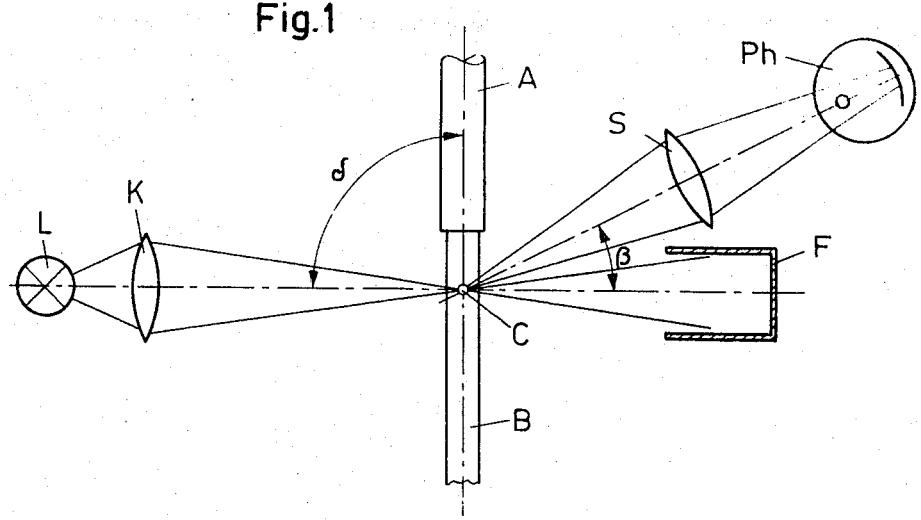
FIG. 1 shows an arrangement for measuring light scattered by the dispersed phase of a suspension in side elevation.
Figure 2:
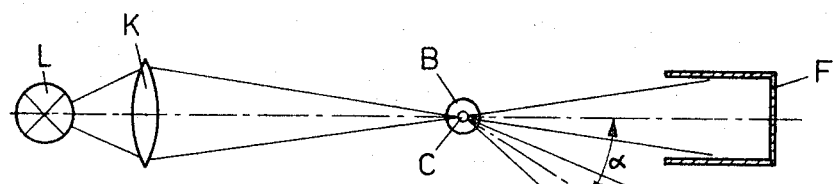
FIG. 2 illustrates the arrangement of FIG. 1 in partly sectional plan view.

Referring initially to FIGS. 1 and 2, there is shown the discharge pipe or nozzle A of a pumping circuit from which a generally cylindrical jet B of the suspension to be treated is discharged downward so that the longitudinal axis of the jet is a straight line. The liquid will be assumed to be essentially water, and the suspended matter to consist largely of microbial cells for the purpose of illustration.

Light emitted by an incandescent lamp L is focused by a condenser lens K on the point of intersection C of the longitudinal jet axis with the optical axis of the incident beam directed by the lens K on the jet B. Light of the beam linearly transmitted by the jet B in the direction of the optical axis of the lens K is largely absorbed in a light trap F, which is a box having one open side and black internal walls. The incident beam and the transmitted beam are aligned and perpendicular to the axis of the jet B so as to define with the jet axis an angle $\delta$ of 90°.

Particles dispersed in the water of the jet B scatter light in all directions, but the intensity of the scattered light varies with its angular relationship to the optical axis of the incident beam. A collecting lens S is arranged to receive some of the scattered light and to direct it on a photoelectric cell Ph, a selenium cell, which generates an electric signal commensurate with the intensity of the scattered light received. The angles $\alpha$ and $\beta$ defined by the transmitted beam and the optical axis of the lens S in the planes of FIGS. 1 and 2 respectively are acute.

The angle $\alpha$ in FIG. 2 indicates the divergence of the lens axis from the transmitted beam in a horizontal plane. It must be smaller than 90°, and is preferably 10° to 45° in order to collect on the cell Ph the most intensive portions of the light scattered by the microorganisms. The angle $\beta$ indicates that the optical axis of the lens S obliquely diverges at the point of intersection from the axis of the tramsmitted beam of the light source L, the divergence being the same when measured from a reference plane which includes the optical axis of the incident beam and a line perpendicular to both the axis of the incident beam and the longitudinal axis of the jet at the point of their intersection. Such a line would be perpendicular to the plane of FIG. 1, and the plane defined would be perpendicular to the plane of FIG. 1 through the optical axis of the incident and transmitted beams.

The angles $\alpha$ and $\beta$ are chosen to encompass the range of greatest intensity of the scattered light in the field of the lens S. The angle $\beta$ is further chosen to minimize the amount of light scattered by reflection within the liquid of the jet with small values of the angle $\alpha$ and independent of the amount of suspended matter. The angle $\beta$ thus must be greater than 0°, and is preferably between 15° and 40°. It also defines the deviation of the optical axis of the lens S from the afore-mentioned reference plane and causes the optical sensing apparatus, including the lens S and the photoelectric cell Ph, to be located outside that reference plane.

While the incident beam of the light source L meets the jet B at right angles in the apparatus of FIGS. 1 and 2, this is not a necessary, nor usually the best arrangement. Even less light deflected by internal reflection of the incident beam reaches the photoelectric cell Ph in the arrangement shown in FIG. 3 in which the angle $\delta$ between the axes of the incident beam and the jet B is smaller than 90°, the illustrated angle of about 60° being most advantageous under many conditions, and the relationship of all other elements relative to the reference plane being as described with reference to FIGS. 1 and 2. It will be appreciated that the reference plane is oblique relative to the lingitudinal axis of the jet B in the modified arrangement of FIG. 3, and is represented in FIG. 3 by the common axis of the incident beam and the linearly transmitted beam.

Figure 3:
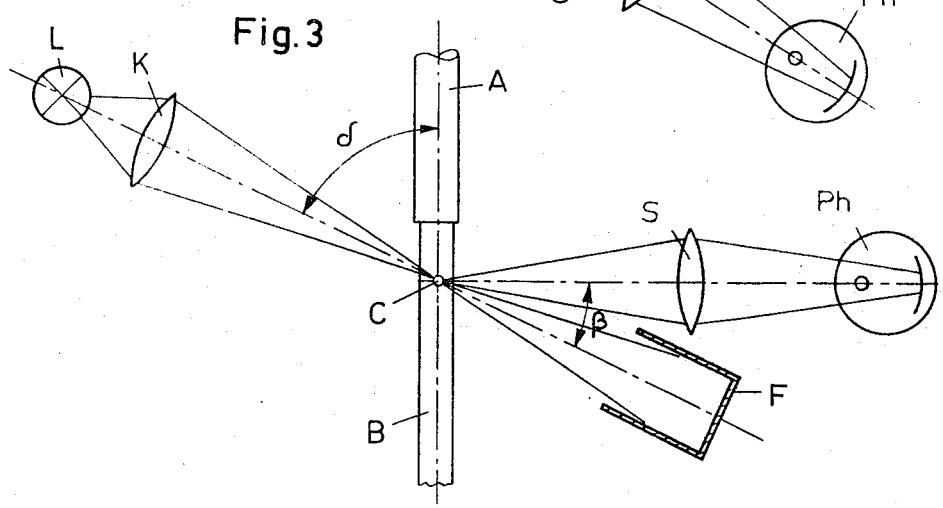
FIG. 3 shows a modification of the arrangement of FIG. 1 in partly sectional side elevation.

For greatest precision, of light scattered by microorganisms, the amount of parasitic light scattered by mineral matter and reaching the photoelectric cell Ph in the modified arrangement of FIG. 3 may be compensated for by providing a second photoelectric element arranged to receive a maximum of such parasitic scattered light, and electrically connected with the principal photoelectric element in bucking relationship.

FIG. 4 shows the largely unchanged apparatus of FIG. 3 amplified for such compensation. The selenium cell Ph has been replaced by a cadmium sulfide cell $Ph_1$ supplied with current $J_1$ by a storage battery through a resistor $R_1$ and receiving scattered light through a lens $S_1$ not significantly different from the afore-described lens S. Additionally, there is provided a compensating cadmium sulfide cell $Ph_2$ in circuit with the battery D for passage of a current $J_2$ through a resistor $R_2$ and receiving light through another positive lens $S_2$. The optical axes of the lens $S_2$ and of the linearly transmitted portion of the incident beam enclose an angle $\phi$ which is at least 90°, and preferably between 90° and 135°, the optimum magnitude of this angle requiring experimental determination for each set of conditions since it is affected by the nature of inorganic material suspended in the jet B and other sources of parasitic scatter.

The field of the lens $S_1$ is preferably chosen to cover the entire angular range in which the light scattered by the microorganisms and like organic matter is at its higest intensity, the field being determined by the angle $\gamma$ at which rays from the point of intersection C diverge toward the rim of the lens $S_1$. The angle $\gamma$ is shown in FIG. 4 to have a magnitude of approximately 20° and such a value is typical of preferred practice of this invention.

The resistors $R_1$, $R_2$ are joined in series, and the voltage E across the terminals of the 1 resistors remote from the juncture is indicative of the difference between the light received by the cell $Ph_1$ and a fraction of the light received by the cell $Ph_2$. If the apparatus is intended for use with different suspensions, the resistor $R_2$ is preferably adjustable so that the apparatus may be set for a zero reading by adjusting the variable resistor while the nozzle A discharges a reference liquid such as pure water. The resistor $R_2$ thus is normally set to a fraction $\epsilon$ of the resistivity of the resistor $R_1$.

The voltage E is fed to an amplifier V whose output current $J_3$ is supplied to an indicating or recording instrument, conventional in itself and not illustrated. The instrument may be calibrated to read directly in weight units of the suspended microorganisms or in similar units.

The apparatus of the invention has been shown only to the extend required to provide an understanding of the invention, and supporting elements and other conventional accessories have been omitted. For the convenience of pictorial representation, all optical axes have been shown to intersect each other in the point C in which the incident beam intersects a longitudinal axis of the jet B. Very adequate results, however, can be achieved if the other optical axes pass through the jet only in the vicinity of the point of intersection of the incident beam axis with the longitudinal jet axis, and it is essential only that the afore-described relationships of each other axes be maintained relative to the reference plane through the optical axis of the incident beam.

Single condenser lenses and single converging lenses have been illustrated and described for the sake of simplicity, but more complex optical systems may obviously be resorted to. As is evident from the disclosed equivalency of selenium and cadmium sulfide cells, and specific nature of the photoelectric elements is not important, and those skilled in the art will readily provide or modify circuitry to achieve the desired indication in a manner obvious from the showing of FIG. 4.

Apparatus of the invention has been used successfully for determining the amount of purifying flocculant needed by raw water, for examining purified waste water for the presence and amount of residual organic solids, and for monitoring the growth of microorganisms in fermentation broths, such as those produced in the manufacture of yeast. Other applications will readily suggest themselves. The reading or organic contaminants in waste water have been found to be in excellent agreement with the results of the much more complex determination of biological oxygen demand.

While the invention has been described with reference to specific embodiments, it should be understood that it is not limited thereto and is to be construed broadly within the scope of the appended claims.

What is claimed is:

1. Apparatus for determining the amount of the dispersed phase in a suspension comprising, in combination:

a. nozzle means for discharging said suspension as a jet having a first longitudinal axis;
   b. a light source;
   c. first optical means for directing light of said source toward said jet as an incident beam having an optical second axis intersecting said first axis;
   d. a photoelectric element;
   e. second optical means for directing light of said beam scattered by said jet on said photoelectric element and for thereby causing said element to generate an electrical signal indicative of the amount of said scattered light, 1. said second optical means having an optical third axis obliquely inclined relative to a reference plane defined by said second axis and a straight line perpendicular to said first and second axes through the point of intersection of said first and second axes,
2. said second optical means being spaced from said plane;

f. another photoelectric element;
g. third optical means having an optical fourth axis and directing light of said incident beam reflected from said jet toward said other photoelectric element,
1. the axis of the portion of said incident beam linearly transmitted by said jet and said fourth axis defining an angle of 90° to 135°; and
h. light trap means spaced from said point of intersection in the direction of said second axis away from said light source for absorbing the light of said source linearly transmitted by set jet.

2. Apparatus as set forth in claim 1, wherein said first and second axes are substantially perpendicular to each other.

3. Apparatus as set forth in claim 1, wherein said first and second axes intersect each other at an angle of approximately 60°.

4. Apparatus as set forth in claim 1, wherein said third axis diverges from said reference plane at an angle of 15° to 40°.

5. Apparatus as set forth in claim 1, further comprising circuit means connecting said photoelectric elements and including signal generating means for generating a signal indicative of a function of the difference of the amounts of light respectively received by said elements.

* * * * *